US012783659B2

(12) United States Patent
Pachisia et al.

(10) Patent No.: US 12,783,659 B2
(45) Date of Patent: Nov. 3, 2026

(54) METHODS AND APPARATUS TO DETERMINE MACHINE LEARNING MODEL CONFIGURATIONS FOR CLASSIFYING MALWARE

(71) Applicant: Musarubra US LLC, San Jose, CA (US)

(72) Inventors: Vikas Pachisia, Bangalore (IN); Oded Margalit, Ramat Gan (IL); John D. Teddy, Missoula, MT (US); MallikharjunaRao Yallavula, Bangalore (IN); SudhirKumar Rai, Bangalore (IN)

(73) Assignee: Musarubra US LLC, San Jose, CA (US)

( * ) Notice: Subject to any disclaimer, the term of this patent is extended or adjusted under 35 U.S.C. 154(b) by 125 days.

(21) Appl. No.: 18/977,584

(22) Filed: Dec. 11, 2024

(65) Prior Publication Data

US 2025/0217484 A1 Jul. 3, 2025

Related U.S. Application Data

(60) Provisional application No. 63/616,129, filed on Dec. 29, 2023.

(51) Int. Cl.
*G06F 21/00* (2013.01)
*G06F 21/56* (2013.01)

(52) U.S. Cl.
CPC .................................. *G06F 21/561* (2013.01)

(58) Field of Classification Search
CPC ...... G06F 21/561; G06F 21/566; G06F 21/56; G06F 21/562; G06F 21/563; G06F 21/564; G06F 21/552; G06F 21/554; G06F 2221/033; G06F 21/565; G06F 21/568; G06F 21/53; G06F 21/55; G06F 21/577; G06F 21/567; G06F 2221/034; G06F 21/52; G06F 21/51; G06F 2221/2119; G06F 21/50; G06F 21/54; H04L 63/145; H04L 63/1416; H04L 63/1425; H04L 63/1441; H04L 63/1408; H04L 63/1433; H04L 63/1483; H04L 63/1491; H04L 2463/144;
(Continued)

(56) References Cited

U.S. PATENT DOCUMENTS

2023/0032194 A1* 2/2023 Lancioni ................ G06F 21/56
2023/0401314 A1* 12/2023 Healy ..................... G06F 21/56
(Continued)

*Primary Examiner* — William A Corum, Jr.
(74) *Attorney, Agent, or Firm* — Hanley, Flight & Zimmerman, LLC

(57) ABSTRACT

Methods and apparatus to determine machine learning (ML) configurations for classifying malware are disclosed. An example server comprises interface circuitry, machine readable instructions, and programmable circuitry to at least one of instantiate or execute the machine readable instructions to determine a computing parameter associated with a computing device, the computing device communicatively coupled to the server, select a ML model to deploy on the computing device based on the computing parameter, determine a configuration of the ML model based on the computing parameter, deploy the ML model to the computing device, and cause the deployed ML model to classify a sample as clean or malicious, the sample received at the computing device.

17 Claims, 10 Drawing Sheets

(58) Field of Classification Search
CPC . H04L 63/14; H04L 63/1458; H04L 63/1466; H04L 63/20; H04L 63/0227; H04L 51/212; H04L 63/0236; H04L 2463/146; H04L 61/4511; H04L 63/0263; H04W 12/128
See application file for complete search history.

(56) References Cited

U.S. PATENT DOCUMENTS

| | | | | |
|---|---|---|---|---|
| 2025/0005457 | A1* | 1/2025 | Divan | G06N 20/00 |
| 2025/0124804 | A1* | 4/2025 | Forrest | G09B 7/08 |

* cited by examiner

METHODS AND APPARATUS TO DETERMINE MACHINE LEARNING MODEL CONFIGURATIONS FOR CLASSIFYING MALWARE

RELATED APPLICATION

This patent claims the benefit of U.S. Provisional Patent Application No. 63/616,129, which was filed on Dec. 29, 2023. U.S. Provisional Patent Application No. 63/616,129 is hereby incorporated herein by reference in its entirety. Priority to U.S. Provisional Patent Application No. 63/616,129 is hereby claimed.

FIELD OF THE DISCLOSURE

This disclosure relates generally to classifying malware and, more particularly, to methods and apparatus to determine machine learning model configurations for classifying malware.

BACKGROUND

In recent years, malware and other threats to computer security have evolved. Detecting and mitigating new malware helps computer security entities improve data security and system security for clients. In addition, detecting and mitigating malware can prevent negative consequences including system compromise, loss of resources, etc., for a computer security entity and/or their clients. To detect and mitigate malware, computer security entities must be aware of threats to computing devices and find solutions to mitigate these threats.

BRIEF DESCRIPTION OF THE DRAWINGS

In general, the same reference numbers will be used throughout the drawing(s) and accompanying written description to refer to the same or like parts.

DETAILED DESCRIPTION

Figure 1:
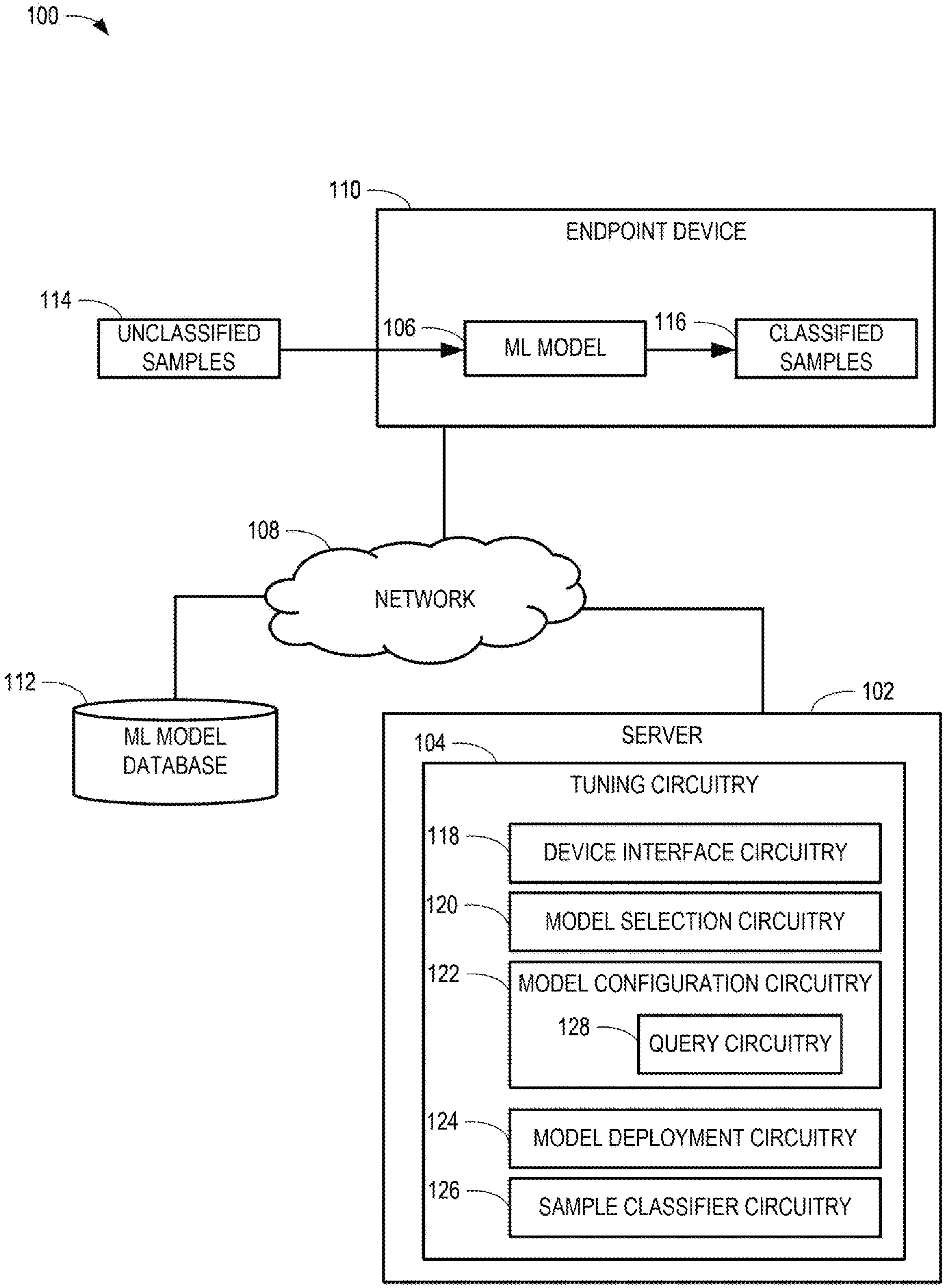
FIG. 1 is a block diagram of an example computing environment in which an example server implements tuning circuitry.

To combat malware, Internet users, corporations, and/or computer system owners (e.g., customers, clients, etc.) may subscribe to and/or otherwise make payments to a computer security entity to access threat protection and detection mechanisms. Threat protection and detection mechanisms are often implemented by classifiers that may be implemented by hardware, software, firmware, and/or any combination thereof. These mechanisms evaluate samples (e.g., files, executable code, configuration files/information, operating system files/information, etc.) to determine whether such samples constitute a threat. In some examples, a sample may represent multiple files (e.g., a directory of files, an executable file and library files associated therewith, etc.). Alternatively, a sample may represent event(s) and/or other communications (e.g., a web request and/or a response thereto).

Features may be derived from a sample and used for classification of whether the sample constitutes a threat. Such features may be identified using static analysis of the sample. For example, filenames, presence of particular information and/or instructions within the sample, organizational structure of the sample, etc., may be represented as one or more features. Additionally or alternatively, features may be identified using dynamic analysis of the sample. Dynamic analysis may include collecting information associated with execution of the sample and/or information associated with a user session on an example device. In some examples, the data associated with the user session may include activity caused by a user and/or on behalf of the user during a time interval the user was connected to (e.g., operating on) the device.

Feature collection may be initiated at a specific time. For example, feature collection may be initiated in response to a trigger event that initiates the monitoring of the activity of a device. An example trigger event may include a process opening an outgoing network connection, a process launch, a file deletion, an API call, etc. In other examples, feature collection can occur during (e.g., throughout) a time interval (e.g., periodic time interval, a time interval triggered by a trigger event, etc.). Example data associated with the device may include activity (e.g., all activity) across the device.

Further, some samples can be malicious executable files (such as portable executable (PE) files) that, when executed and/or instantiated, can compromise a computing and/or electronic device. The PE file format is a data structure that encapsulates executable code with the information necessary for an operating system (OS) to manage the encapsulated or wrapped executable code. In addition, such malicious executable files may initiate/trigger an Application Programming Interface (API) call sequence.

A user may download or otherwise access a compromised PE file onto an endpoint device. The compromised PE file may include an executable that is malware. Upon initiating (e.g., opening) such a PE file, a user may have inadvertently executed and/or instantiated malware that has been disguised as a legitimate executable file. After the malware is executed and/or instantiated, the endpoint device may become compromised.

Some threat protection and detection mechanisms utilize machine learning (ML) to aid in classification. Artificial intelligence (AI), including ML, deep learning (DL), and/or other artificial machine-driven logic, enables machines (e.g., computers, logic circuits, etc.) to use a model to process input data to generate an output based on patterns or associations previously learned by the model via a training process. For instance, the model may be trained with data (e.g., classified samples) to recognize patterns and/or associations and follow such patterns and/or associations when processing input data (e.g., unclassified samples) such that other input(s) result in output(s) consistent with the recognized patterns and/or associations.

An example computing environment may have hundreds, if not thousands, of computing devices (e.g., endpoint devices) that employ an ML model to classify samples as clean or malicious. A single ML model may be deployed on a wide range of computing devices varying in computing capabilities (e.g., power, available memory, etc.). As such, a server associated with the computing environment typically deploys an ML model that can operate on the computing device(s) with the lowest computing capabilities (e.g., 8 gigabyte (GB) random access memory (RAM)) because such an ML model will also be compatible with device(s) having higher computing capabilities (e.g., 32 GB RAM). However, a uniform ML model executed by a plurality of computing devices may have uniform detection results. For example, if the uniform ML model incorrectly classifies a malicious sample as clean on a first computing device in the computing environment, then the ML model is likely to make the same incorrect classification on second, third, fourth, etc., computing devices. In turn, the misclassified sample may expose each of the computing devices in the computing environment to malware.

Examples disclosed herein determine unique ML model configurations to capitalize on the diverse computing capabilities of computing devices operating to detect malware in an example computing environment. As used herein, a "ML model configuration," a "model configuration," and/or a "configuration" can refer to a number of ML models to deploy to an example computing device, a number of model features to train an example ML model, a number of parameters to evaluate the output(s) of an example ML model, a type/kind of ML model, etc. Further, disclosed examples determine (e.g., tailor) model configurations based on a computing parameter associated with the endpoint device. As used herein, a "computing parameter" is an operating capability of a computing device such as amount of available memory (e.g., RAM), central processing unit (CPU) capacity (e.g., number of cores), clock speed (e.g., gigahertz (GHz)), etc. Examples disclosed herein ensure that the complexity and performance of the model configuration is proportional to (e.g., matches) the complexity and performance of the endpoint device. So instead of a uniform ML model deployed to a plurality of devices in a computing environment, examples disclosed herein can tailor ML model configurations to unique computing parameters associated with each computing device in a computing environment. Moreover, examples disclosed herein generate diverse ML model configurations that offer a wide variety of detection mechanisms to scan (e.g., analyze) unclassified samples. For example, disclosed examples can generate ML model configurations for ML models to classify executable code, PE files, activity associated with an endpoint device, etc. Further, examples disclosed herein improve the performance of an example computing device by freeing up computing capacity that might have otherwise been used to sort, classify, or mitigate potentially malicious samples.

FIG. 1 is a block diagram of an example computing environment 100 in which an example server 102 implements example tuning circuitry 104 to determine (e.g., tune, update, modify, optimize, etc.) a configuration of an example ML model 106. The example computing environment 100 includes the example server 102, an example network 108, an example endpoint device 110, and an example ML model database 112. The example server 102 includes the tuning circuitry 104. The example endpoint device 110 includes the ML model 106. In the example of FIG. 1, the computing environment 100 illustrates one example endpoint device 110. However, the example computing environment 100 can include any number of example endpoint devices (e.g., 2, 100, 1,000, etc.). Further, the example computing environment 100 can represent an environment in which a customer of an example cybersecurity company (e.g., Trellix) deploys a threat protection and detection mechanism (e.g., the tuning circuitry 104 and the ML model 106). In the illustrated example of FIG. 1, the tuning circuitry 104 is implemented by the server 102. In some examples, the tuning circuitry 104 is implemented by the endpoint device 110.

The example network 108 may be the Internet. However, the example network 108 may be implemented using any suitable wired and/or wireless network(s) including, for example, one or more data buses, one or more local area networks (LANs), one or more wireless LANs, one or more cellular networks, one or more private networks, one or more public networks, etc. The example network 108 may be monitored, maintained, or operated by an example computer security entity responsible for managing operation of the endpoint device 110. Alternatively, the example network 108 is monitored, maintained, or operated by a customer of the example computer security entity, wherein the customer is responsible for managing operation of the endpoint device. Further, the example network 108 enables the computer security entity, the customer of the computer security entity, the endpoint device 110, the server 102, other endpoint devices in the computing environment 100, and the ML model database 112 to communicate.

The example ML model 106 accesses unclassified samples 114 to determine classified samples 116. However, the example tuning circuitry 104 determines an example ML model configuration for the ML model 106 based on a computing parameter associated with the endpoint device 110. As such, the example ML model 106 can classify the unclassified samples 114 as clean or malicious. The example tuning circuitry 104 includes example device interface circuitry 118, example model selection circuitry 120, example model configuration circuitry 122, example model deployment circuitry 124, and example sample classifier circuitry 126. The example model configuration circuitry 122 includes example query circuitry 128. The tuning circuitry 104 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the tuning circuitry 104 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware.

Moreover, in some examples, some or all of the circuitry of FIG. 1 may be implemented by microprocessor circuitry executing instructions and/or FPGA circuitry performing operations to implement one or more virtual machines and/or containers.

The example device interface circuitry 118 determines an example computing parameter associated with the endpoint device 110. For example, the device interface circuitry 118 determines an available memory (e.g., 8 GB RAM, 32 GB RAM, etc.) associated with the endpoint device 110, a CPU capacity (e.g., 2 cores, 8 cores, etc.) associated with the endpoint device 110, a clock speed (e.g., 2 GHz, 3.5 GHz, etc.) associated with the endpoint device 110, etc. In some examples, the device interface circuitry 118 may be communicatively coupled with the endpoint device 110 to determine computing parameters associated with the endpoint device 110. In other examples, the device interface circuitry 118 may access computing parameters associated with the endpoint device 110 via the network 108 (e.g., the Internet). In some examples, the device interface circuitry 118 is instantiated by programmable circuitry executing interfacing instructions and/or configured to perform operations such as those represented by the flowchart of FIG. 2.

In some examples, the tuning circuitry 104 includes first means for determining a computing parameter of an endpoint device. For example, the first means for determining may be implemented by the example device interface circuitry 118. In some examples, the device interface circuitry 118 may be instantiated by programmable circuitry such as the example programmable circuitry 712 of FIG. 7. For instance, the example device interface circuitry 118 may be instantiated by the example microprocessor 800 of FIG. 8 executing machine executable instructions such as those implemented by at least block 202 of FIG. 2. In some examples, the device interface circuitry 118 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example device interface circuitry 118 may be instantiated by any other combination of hardware, software, and/or firmware. For example, the device interface circuitry 118 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model selection circuitry 120 selects an example ML model (e.g., the ML model 106) to deploy to the endpoint device 110. In the example of FIG. 1, the ML model 106 may already be running on the endpoint device 110. In other examples, the model selection circuitry 120 may select (e.g., gather, access, etc.) the ML model 106 to deploy to the endpoint device 110 from the ML model database 112. The example ML model database 112 stores ML models, model feature sets, model parameter sets, etc. For example, the ML model database 112 may store the ML model 106, which can include instructions to execute at least one of a logistic regression model, a support vector machine algorithm, a Naive Bayes algorithm, a decision tree, a random forest, etc. Additionally, an example feature set may include activity associated with a user session on the endpoint device 110. For example, such activity may include files accessed, process behaviors, etc. In some examples, a user session may be monitored or otherwise recorded to capture these features (e.g., during a set period of time, at repeated time intervals, etc.).

In some examples, the model selection circuitry 120 selects the ML model 106 based on the computing parameter of the endpoint device 110. Additionally or alternatively, the model selection circuitry 120 can select the ML model based on the ML models running on additional endpoint devices (different from the endpoint device 110) in the computing environment 100. For example, if an additional example endpoint device in the computing environment 100 includes a first ML model (e.g., a Naive Bayes algorithm), then the model selection circuitry 120 can select a second ML model (e.g., a random forest algorithm) to deploy to the endpoint device 110. As such, the example endpoint device 110 and the additional endpoint device can include unique (e.g., diverse) ML models in the computing environment to provide a range of sample classification capabilities (e.g., instead of the uniform ML model).

Although the example model selection circuitry 120 selects one example ML model 106 in the example of FIG. 1, the model selection circuitry 120 can select more than one ML model to deploy to the endpoint device 110 based on the computing parameter. For example, the model selection circuitry 120 can determine whether the computing parameter associated with the endpoint device 110 satisfies an example threshold parameter. If the computing parameter associated with the example endpoint device 110 is 8 GB RAM and the threshold parameter is 10 GB RAM, then the model selection circuitry 120 can determine that the first computing parameter does not satisfy the threshold parameter (e.g., 8 GB RAM<10 GB RAM). In such examples, the model selection circuitry 120 selects one (e.g., a random forest algorithm) ML model (e.g., the ML model 106) to deploy to the endpoint device 110. In this example, the computing parameter associated with the endpoint device 110 indicates a relatively low bandwidth (e.g., 8 GB RAM) that does not satisfy the threshold parameter of 10 GB RAM. As such, the model selection circuitry 120 selects one ML model to deploy to the endpoint device 110 because the endpoint device 110 may only be able to operate one ML model.

Alternatively, if the computing parameter associated with the endpoint device 110 is 32 GB RAM and the threshold parameter is 10 GB RAM, then the model selection circuitry 120 can determine that the first computing parameter satisfies the threshold parameter (e.g., 32 GB RAM>10 GB RAM). In such examples, the model selection circuitry 120 can select at least two models (e.g., a Naive Bayes algorithm and a random forest algorithm) to deploy to the endpoint device 110. In some examples, the at least two selected models can classify the unclassified samples 114 in parallel (e.g., at the approximately the same time within 1 second). In this example, the computing parameter associated with the endpoint device 110 indicates a relatively high bandwidth (e.g., 32 GB RAM) that does satisfy the threshold parameter of 10 GB RAM. As such, the model selection circuitry 120 selects at least two ML models to deploy to the endpoint device 110 because the endpoint device 110 can operate additional ML models. In some examples, the model selection circuitry 120 is instantiated by programmable circuitry executing selection instructions and/or configured to perform operations such as those represented by the flowchart(s) of FIGS. 2 and 3.

In some examples, the tuning circuitry 104 includes means for selecting an ML model. For example, the means for selecting may be implemented by the model selection circuitry 120. In some examples, the model selection circuitry 120 may be instantiated by programmable circuitry such as the example programmable circuitry 712 of FIG. 7. For instance, the example model selection circuitry 120 may be instantiated by the example microprocessor 800 of FIG. 8 executing machine executable instructions such as those implemented by at least block 204 of FIG. 2 and blocks 300, 302, 304 of FIG. 3. In some examples, the example model selection circuitry 120 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example model selection circuitry 120 may be instantiated by any other combination of hardware, software, and/or firmware. For example, the model selection circuitry 120 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model configuration circuitry 122 determines an example configuration of the selected ML model 106 based on the computing parameter of the endpoint device 110. In some examples, the model configuration circuitry 122 determines a configuration of the selected ML model 106 based on a default configuration associated with the selected ML model 106. As used herein, a "default configuration" is a predetermined and/or preloaded configuration of the selected ML model 106. An example default configuration can include a default number of features, a default number of parameters, etc. In other examples, the model configuration circuitry 122 can determine a configuration of the selected ML model 106 based on a stored configuration in the ML model database 112. As used herein, a "stored configuration" is a configuration including a feature set, a parameter set, etc., that is stored (e.g., saved) in the ML model database 112. In some examples, the stored configuration is a random selection of features, parameters, etc., stored in the ML model database 112. Further, the model configuration circuitry 122 can determine a configuration of the selected ML model 106 based on an external configuration associated with another endpoint device in the computing environment 100. As used herein, an "external configuration" refers to a configuration associated with a ML model deployed to an example endpoint device (e.g., a second endpoint device, another endpoint device, etc.) in the computing environment 100 different from the endpoint device 110. For example, the server 102 can be communicatively coupled to a first endpoint device (e.g., the endpoint device 110) and a second endpoint device such that the server 102 can access (e.g., read) configuration(s) associated with ML model(s) executed on the second endpoint device. In some examples, the model configuration circuitry 122 can generate a model configuration for the selected ML model 106 that is different from the external model configuration.

The model configuration circuitry 122 utilizes the query circuitry 128 to transmit at least one query to request stored configuration(s) and/or external configuration(s). For example, the query circuitry 128 can transmit a query to the ML model database 112 (e.g., via the network 108) to request at least one stored configuration from the ML model database 112. In some examples, the query circuitry 128 can transmit a query to the endpoint device 110 to request a default configuration associated with the ML model 106 (e.g., if the ML model 106 is already deployed to the device 110). Additionally or alternatively, the example query circuitry 128 can transmit a query to additional endpoint devices in the computing environment 100 (e.g., via the network 108) to request at least one external configuration from another endpoint device in the computing environment 100.

The example model configuration circuitry 122 can determine features and/or parameters for the configuration of the selected ML model 106. In some examples, the model configuration circuitry 122 can modify and/or otherwise generate the configuration of the selected ML model 106 based on at least one of the computing parameter, a default configuration, a stored configuration, or an external configuration. Such an example process is described in detail in connection with FIG. 5. In some examples, the model configuration circuitry 122 determines configurations for each ML model selected by the model selection circuitry 120. In some examples, the model configuration circuitry 122 is instantiated by programmable circuitry executing model configuration instructions and/or configured to perform operations such as those represented by the flowchart(s) of FIGS. 2, 4, and 5. In some examples, the query circuitry 128 is instantiated by programmable circuitry executing querying instructions and/or configured to perform operations such as those represented by the flowchart of FIG. 4.

In some examples, the tuning circuitry 104 includes second means for determining a configuration for a ML model. For example, the second means for determining may be implemented by the example model configuration circuitry 122. In some examples, the model configuration circuitry 122 may be instantiated by programmable circuitry such as the example programmable circuitry 712 of FIG. 7. For instance, the example model configuration circuitry 122 may be instantiated by the example microprocessor 800 of FIG. 8 executing machine executable instructions such as those implemented by at least block 206 of FIG. 2, blocks 400, 402, 404, 410, 412, 414 of FIG. 4, and blocks 500, 502, 504, 506, 508, 510, 512 of FIG. 5. In some examples, the model configuration circuitry 122 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example model configuration circuitry 122 may be instantiated by any other combination of hardware, software, and/or firmware. For example, the model configuration circuitry 122 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the second means for determining a configuration includes means for querying. For example, the means for querying may be implemented by the example query circuitry 128. In some examples, the query circuitry

Figure 7:
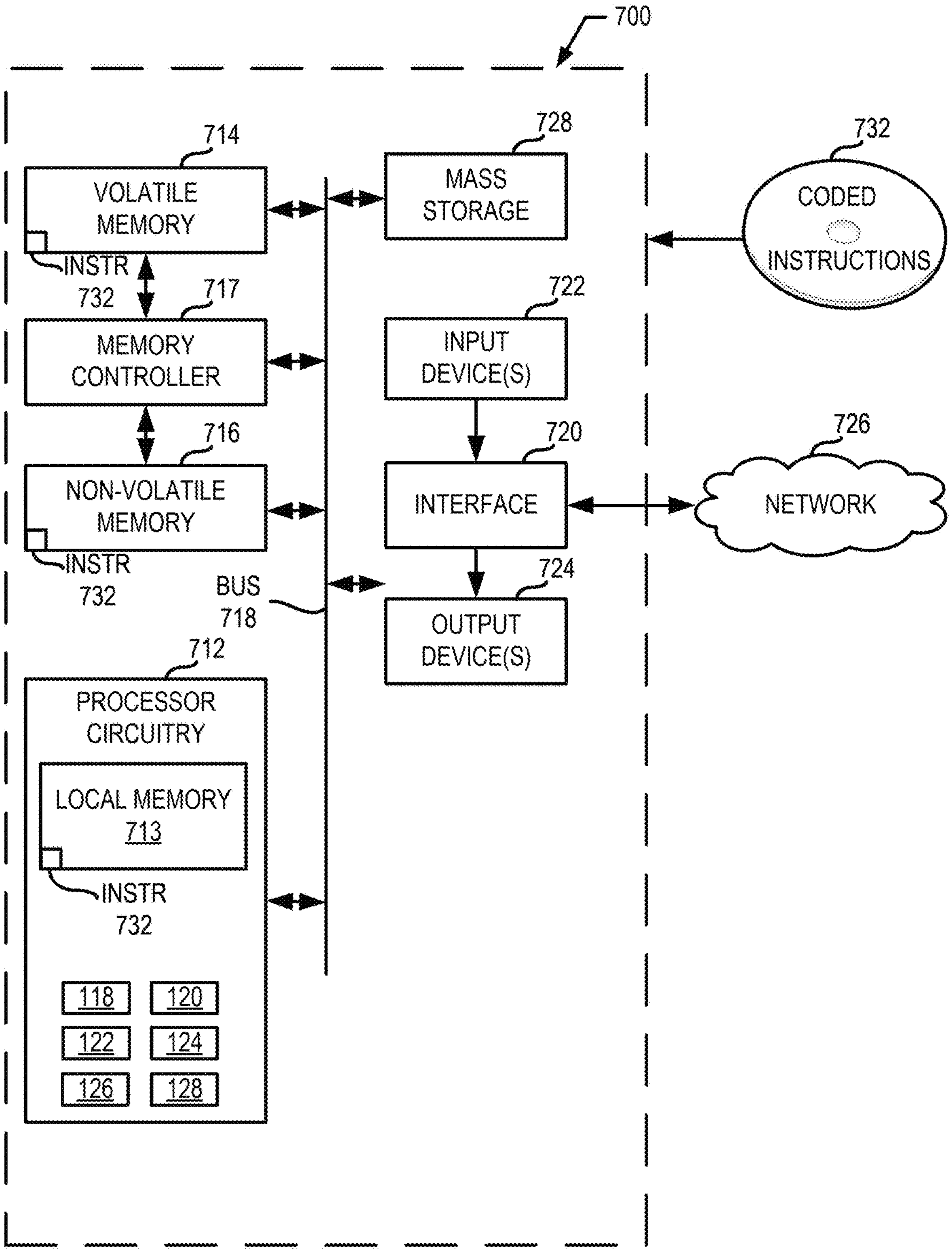
FIG. 7 is a block diagram of an example processing platform including programmable circuitry structured to execute, instantiate, and/or perform the example machine readable instructions and/or perform the example operations of FIGS. 2-5 to implement the tuning circuitry of FIG. 1.

128 may be instantiated by programmable circuitry such as the example programmable circuitry 712 of FIG. 7. For instance, the example query circuitry 128 may be instantiated by the example microprocessor 800 of FIG. 8 executing machine executable instructions such as those implemented by at least blocks 406, 408 of FIG. 4. In some examples, the query circuitry 128 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example query circuitry 128 may be instantiated by any other combination of hardware, software, and/or firmware. For example, the query circuitry 128 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example model deployment circuitry 124 deploys the selected ML model 106 to the endpoint device 110. For example, the model deployment circuitry 124 can deploy the selected ML model 106 having the model configuration (determined by the model configuration circuitry 122) to the endpoint device 110. Accordingly, the selected ML model 106 can classify the unclassified samples 114 at the endpoint device 110. In some examples, the model deployment circuitry 124 can deploy more than one ML model to the endpoint device 110. As such, more than one ML model can classify the unclassified samples 114 at the endpoint device 110. In some examples, the tuning circuitry 104 assesses the endpoint device 110 to update/change the ML model configuration without necessarily changing or reconfiguring the ML model configuration. In such examples, the model deployment circuitry 124 maintains or keeps the whichever ML model was already deployed to the endpoint device 110. Further, the model deployment circuitry 124 prevents or limits deployment of the selected ML model 106 so that the original ML model can continue to classify samples. As such, the tuning circuitry 104 can monitor/assess/observe performance of ML models and ML model configurations without changing or deploying new ML model configurations to the endpoint device 110. In some examples, the model deployment circuitry 124 is instantiated by programmable circuitry executing model deployment instructions and/or configured to perform operations such as those represented by the flowchart of FIG. 2.

In some examples, the tuning circuitry 104 includes means for deploying a ML model to an example endpoint device. For example, the means for deploying may be implemented by the model deployment circuitry 124. In some examples, the model deployment circuitry 124 may be instantiated by programmable circuitry such as the example programmable circuitry 712 of FIG. 7. For instance, the example model deployment circuitry 124 may be instantiated by the example microprocessor 800 of FIG. 8 executing machine executable instructions such as those implemented by at least block 208 of FIG. 2. In some examples, the model deployment circuitry 124 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example model deployment circuitry 124 may be instantiated by any other combination of hardware, software, and/or firmware. For example, the model deployment circuitry 124 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example sample classifier circuitry 126 causes the ML model 106 (e.g., the deployed ML model) to classify at least one of the unclassified samples 114. In the example of FIG. 1, the unclassified samples 114 are received at the endpoint device 110. When the example sample classifier circuitry 126 causes the deployed ML model 106 to classify the unclassified samples 114, the deployed ML model 106 can classify the at least one of the unclassified samples 114 (e.g., a first one of the unclassified samples 114, portions of the first one of the unclassified samples 114, all of the unclassified samples, etc.) as clean or malicious. In other examples, when the sample classifier circuitry 126 causes the deployed ML model 106 to classify the unclassified samples 114, a first one of the unclassified samples 114 may be executed in a safe framework (e.g., a sandbox) to monitor (e.g., record, observe, etc.) the execution/operation of the file. For example, the sample classifier circuitry 126 can open (e.g., initiate) the first one of the unclassified samples 114 to observe behaviors associated with the execution of the first one of the unclassified samples 114. Such an observation may occur during a set period of time, at repeated time intervals, etc.

In some examples, the unclassified samples 114 include data associated with a user session on the endpoint device 110. For example, the data associated with the user session may include activity caused by a user and/or on behalf of the user during the time interval the user was connected to (e.g., operating on) the endpoint device 110. Such example data may be collected in response to a trigger event (e.g., monitoring the activity of the endpoint device 110 when a process opens an outgoing network connection). In other examples, the trigger event may include a process launch, a file deletion, an API call, etc. Example data associated with the endpoint device 110 may include activity (e.g., all activity) across the endpoint device 110.

The example sample classifier circuitry 126 can cause the deployed ML model 106 to classify the data associated with the user session on the endpoint device 110. In particular, the deployed ML model 106 may be configured to collect (e.g., gather, extract, etc.) features associated with this data and, in turn, classify the data as clean or malicious based on the collected features. In some examples, the sample classifier circuitry 126 is instantiated by programmable circuitry executing sample classification instructions and/or configured to perform operations such as those represented by the flowchart of FIG. 2.

In some examples, the tuning circuitry 104 includes means for classifying a sample. For example, the means for classifying may be implemented by the sample classifier circuitry 126. In some examples, the sample classifier circuitry 126 may be instantiated by programmable circuitry such as the example programmable circuitry 712 of FIG. 7. For instance, the example sample classifier circuitry 126 may be instantiated by the example microprocessor 800 of FIG. 8 executing machine executable instructions such as those implemented by at least block 210 of FIG. 2. In some examples, the sample classifier circuitry 126 may be instantiated by hardware logic circuitry, which may be implemented by an ASIC, XPU, or the FPGA circuitry 900 of FIG. 9 configured and/or structured to perform operations corresponding to the machine readable instructions. Additionally or alternatively, the example sample classifier circuitry 126 may be instantiated by any other combination of hardware, software, and/or firmware. For example, the sample classifier circuitry 126 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the tuning circuitry 104 of FIG. 1 is illustrated in FIG. 1, one or more of the elements, processes, and/or devices illustrated in FIG. 1 may be combined, divided, re-arranged, omitted, eliminated, and/or implemented in any other way. Further, the example device interface circuitry 118, the example model selection circuitry 120, the example model configuration circuitry 122, the example query circuitry 128, the example model deployment circuitry 124, the example sample classifier circuitry 126, and/or, more generally, the example tuning circuitry 104 of FIG. 1, may be implemented by hardware alone or by hardware in combination with software and/or firmware. Thus, for example, any of the example device interface circuitry 118, the example model selection circuitry 120, the example model configuration circuitry 122, the example query circuitry 128, the example model deployment circuitry 124, the example sample classifier circuitry 126, and/or, more generally, the example tuning circuitry 104, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example tuning circuitry 104 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine readable instructions, which may be executed by programmable circuitry to implement and/or instantiate the tuning circuitry 104 of FIG. 1 and/or representative of example operations which may be performed by programmable circuitry to implement and/or instantiate the tuning circuitry 104 of FIG. 1, are shown in FIGS. 2-5. The machine readable instructions may be one or more executable programs or portion(s) of one or more executable programs for execution by programmable circuitry such as the programmable circuitry 712 shown in the example processor platform 700 discussed below in connection with FIG. 7 and/or may be one or more function(s) or portion(s) of functions to be performed by the example programmable circuitry (e.g., an FPGA) discussed below in connection with FIGS. 8 and/or 9. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 2-5, many other methods of implementing the example tuning circuitry 104 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an API, etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2-5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 2:
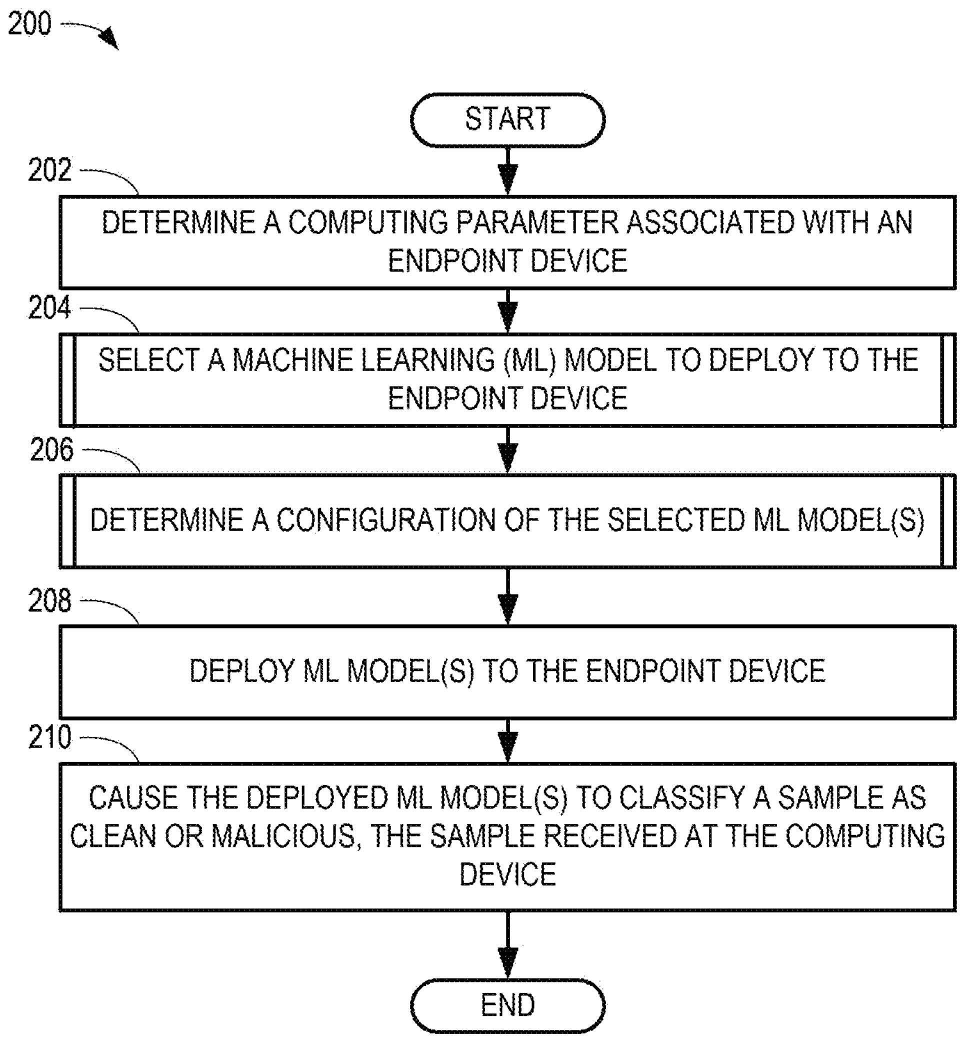
FIGS. 2-5 are flowcharts representative of example machine readable instructions and/or example operations that may be executed, instantiated, and/or performed by example programmable circuitry to implement the tuning circuitry of FIG. 1.

FIG. 2 is a flowchart representative of example machine readable instructions and/or example operations 200 that may be executed, instantiated, and/or performed by programmable circuitry to mitigate malware in an example computing environment. The example machine-readable instructions and/or the example operations 200 of FIG. 2 begin at block 202, at which the device interface circuitry 118 determines a computing parameter associated with the endpoint device 110. For example, the device interface circuitry 118 determines an available memory (e.g., 8 GB RAM, 32 GB RAM, etc.) associated with the endpoint device 110, a CPU capacity (e.g., 2 cores, 8 cores, etc.) associated with the endpoint device 110, a clock speed (e.g., 2 GHz, 3.5 GHz, etc.) associated with the endpoint device 110, etc. In some examples, the device interface circuitry 118 may be communicatively coupled with the endpoint device 110 to determine computing parameters associated with the endpoint device 110. In other examples, the device interface circuitry 118 may access computing parameters associated with the endpoint device 110 via the network 108 (e.g., the Internet).

At block 204, the example model selection circuitry 120 selects an example ML model (e.g., the ML model 106) to deploy to the endpoint device 110. For example, the model selection circuitry 120 may select the ML model 106 to deploy to the endpoint device 110 from the ML model database 112. For example, the ML model database 112 may store the ML model 106, which can include instructions to execute at least one of a logistic regression model, a support vector machine algorithm, a Naive Bayes algorithm, a decision tree, a random forest, etc. In some examples, the model selection circuitry 120 can select the ML model based on the ML models executed by additional endpoint devices (different from the endpoint device 110) in the computing environment 100. In other examples, the model selection circuitry 120 selects the ML model 106 based on the computing parameter of the endpoint device 110, as described in detail in connection with FIG. 3.

At block 206, the example model configuration circuitry 122 determines a configuration of the selected ML model 106. In some examples, the model configuration circuitry 122 determines configurations for each ML model selected by the model selection circuitry 120. In some examples, the model configuration circuitry 122 determines a configuration for the selected ML model 106 based on at least one of a default configuration associated with the selected ML model 106, a stored configuration stored in the ML model database 112, or an external configuration associated with another endpoint device, described in detail in connection with FIG. 4. Further, the model configuration circuitry 122 can determine a configuration by selecting features and/or parameters from the ML model database 112, described in detail in connection with FIG. 5.

At block 208, the example model deployment circuitry 124 deploys the selected ML model 106 to the endpoint device 110. For example, the model deployment circuitry 124 can deploy the selected ML model 106 having the model configuration (determined by the model configuration circuitry 122) to the endpoint device 110. Accordingly, the selected ML model 106 can classify the unclassified samples 114 at the endpoint device 110. In some examples, the model deployment circuitry 124 can deploy more than one ML model to the endpoint device 110. As such, more than one ML model can classify the unclassified samples 114 at the endpoint device 110.

At block 210, the example sample classifier circuitry 126 causes the deployed ML model 106 to classify a sample (e.g., a first one of the unclassified samples). In the example of FIG. 1, the unclassified samples 114 are received at the endpoint device 110. When the example sample classifier circuitry 126 causes the deployed ML model 106 to classify at least one of the unclassified samples 114, the deployed ML model 106 can classify the at least one of the unclassified samples 114 (e.g., a first one of the unclassified samples 114, portions of the first one of the unclassified samples 114, all of the unclassified samples, etc.) as clean or malicious. In other examples, when the sample classifier circuitry 126 causes the deployed ML model to classify the unclassified samples 114, a first one of the unclassified samples 114 may be executed in a safe framework (e.g., a sandbox) to monitor (e.g., record, observe, etc.) the execution/operation of the file. For example, the sample classifier circuitry 126 can open (e.g., initiate) the first one of the unclassified samples 114 to observe behaviors associated with the execution of the first one of the unclassified samples 114. Such an observation may occur during a set period of time, at repeated time intervals, etc. In other examples, the sample classifier circuitry 126 can cause the deployed ML model 106 to classify the data associated with the user session on the endpoint device 110. Then, the process ends.

Figure 3:
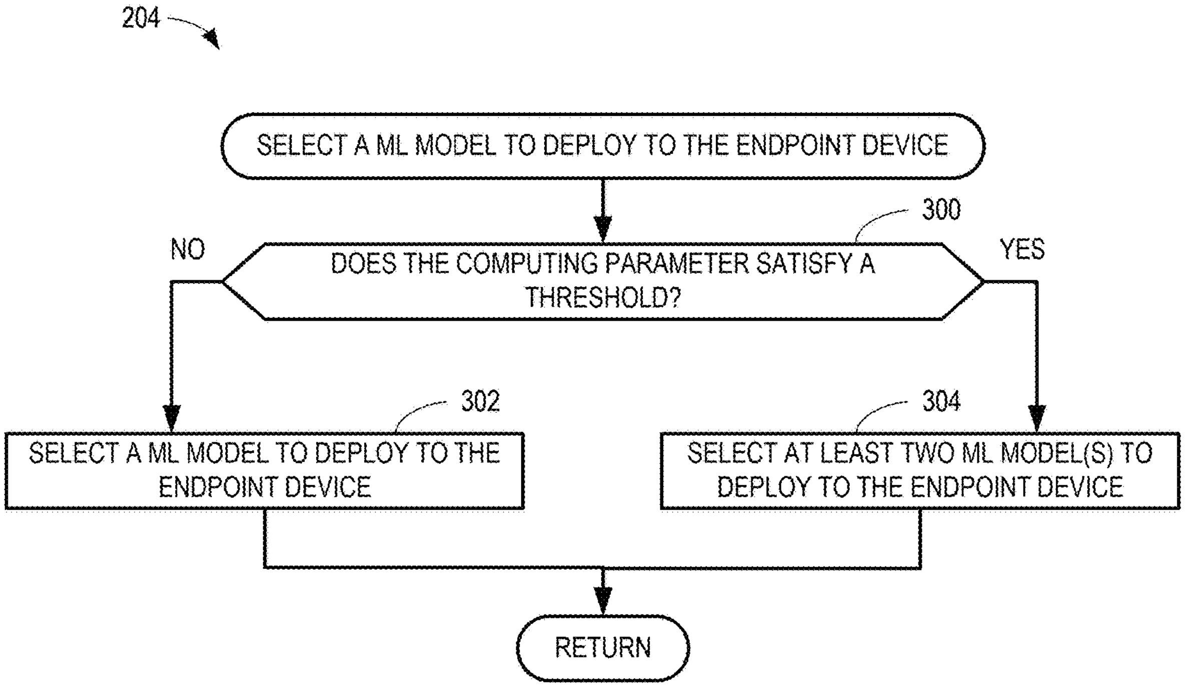

FIG. 3 is a flowchart representative of example machine readable instructions and/or example operations that may be executed, instantiated, and/or performed by programmable circuitry to select a ML model to deploy to the endpoint device 110 in connection with block 204 in FIG. 2. The example machine-readable instructions and/or the example operations of FIG. 3 begin at block 300, at which the model selection circuitry 120 determines whether the computing parameter associated with the endpoint device 110 satisfies an example threshold parameter. For example, if the computing parameter associated with the endpoint device 110 is 8 GB RAM and the threshold parameter is 10 GB RAM, then the model selection circuitry 120 can determine that the computing parameter does not satisfy the threshold parameter (e.g., 8 GB RAM<10 GB RAM). In such examples, the process proceeds to block 302. Alternatively, if the computing parameter associated with the endpoint device 110 is 32 GB RAM and the threshold parameter is 10 GB RAM, then the model selection circuitry 120 can determine that the computing parameter satisfies the threshold parameter (e.g., 32 GB RAM>10 GB RAM). In such examples, the process proceeds to block 304.

At block 302, the model selection circuitry 120 selects one (e.g., a random forest algorithm) ML model (e.g., the ML model 106) to deploy to the endpoint device 110. In this example, the computing parameter associated with the endpoint device 110 indicates a relatively low bandwidth (e.g., 8 GB RAM) that does not satisfy the threshold parameter of 10 GB RAM. As such, the model selection circuitry 120 selects one ML model to deploy to the endpoint device 110 because the endpoint device 110 may only be able to operate one ML model. In some examples, the model selection circuitry 120 selects a static feature based model trained used simple algorithms (e.g., random forest) based on the relatively low bandwidth of the endpoint device 110. In some examples, the model selection circuitry 120 selects the ML model that is associated with the endpoint device 110. For example, the model selection circuitry 120 determines that whichever ML model is currently deployed to the endpoint device 110 is sufficient based on the relatively low bandwidth. Then, the process returns to block 206 in FIG. 2.

At block 304, the model selection circuitry 120 can select at least two models (e.g., a Naive Bayes algorithm and a random forest algorithm) to deploy to the endpoint device 110. In some examples, the at least two selected models can classify the unclassified samples 114 in parallel. In this example, the computing parameter associated with the endpoint device 110 indicates a relatively high bandwidth (e.g., 32 GB RAM) that does satisfy the threshold parameter of 10 GB RAM. As such, the model selection circuitry 120 selects at least two ML models to deploy to the endpoint device 110 because the endpoint device 110 can operate additional ML models. In some examples, the model selection circuitry 120 selects one ML model that is more advanced/complex (e.g., compared to static ML models using random forests) based on the relatively high bandwidth of the endpoint device 110. For example, the model selection circuitry 120 selects at least one of a behavioral observation model, which uses dynamic features and advanced ML algorithms (e.g., an Extreme Gradient Boost (XGBoost) or a Light Gradient Boosting Machine (LightGBM)). In some examples, one of the selected ML models includes whichever ML model is currently deployed to the endpoint device 110. Then, the process returns to block 206 in FIG. 2.

Figure 4:
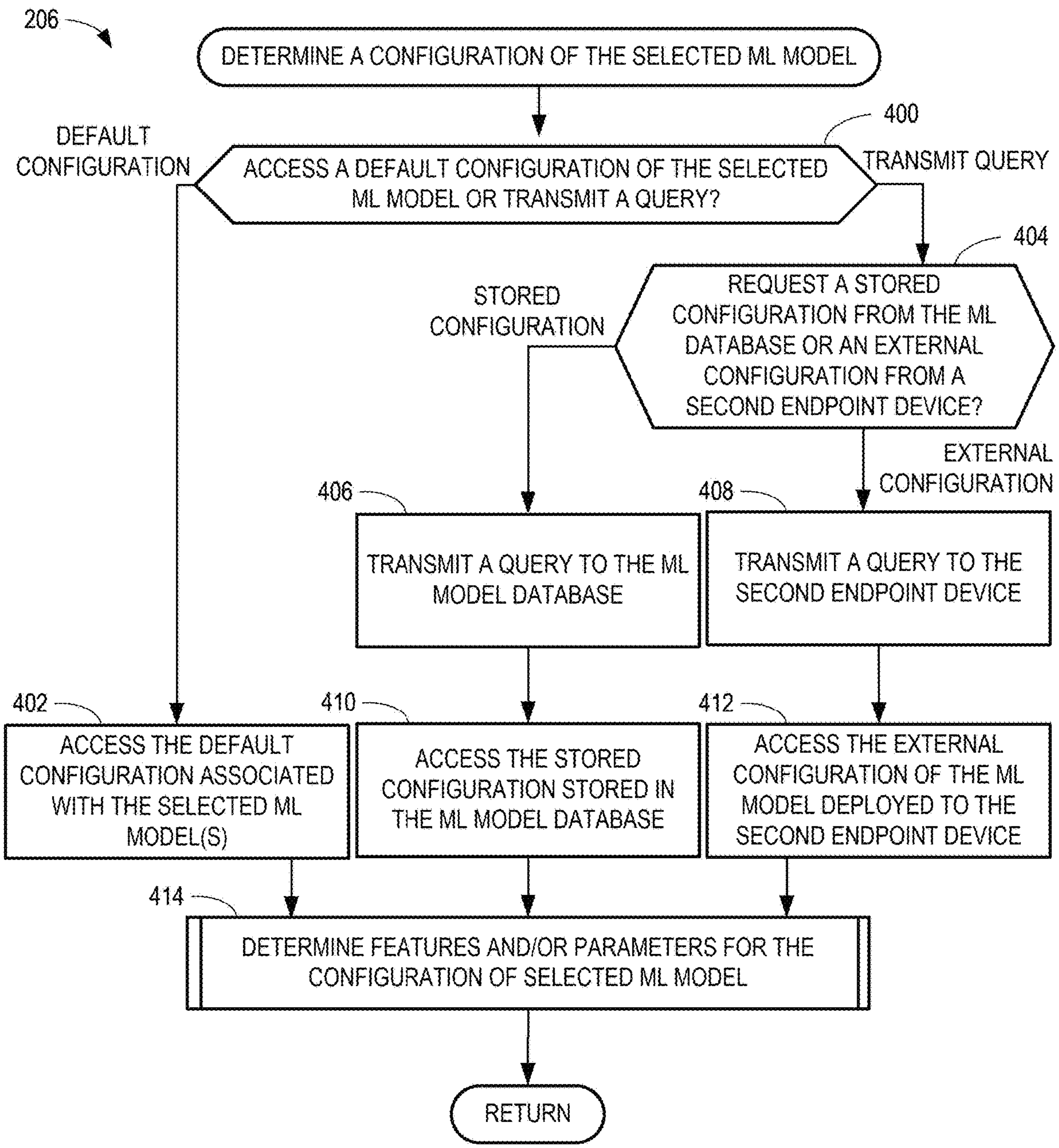

FIG. 4 is a flowchart representative of example machine readable instructions and/or example operations that may be executed, instantiated, and/or performed by programmable circuitry to determine a configuration of the selected ML model 106 in connection with block 206 of FIG. 2. The example machine-readable instructions and/or the example operations of FIG. 4 begin at block 400, at which the example model configuration circuitry 122 determines whether to access a default configuration of the selected ML model 106 or to transmit a query. If the example model configuration circuitry 122 determines to access a default configuration of the selected ML model 106, then the process proceeds to block 402. Alternatively, if the example model configuration circuitry 122 determines to transmit a query, then the process proceeds to block 404.

At block 402, the example model configuration circuitry 122 accesses the default configuration associated with the selected ML model 106. In some examples, the selected ML model 106 includes a default (e.g., predetermined) configuration having a predetermined feature set, predetermined parameter set, etc.

At block 404, the model configuration circuitry 122 determines whether to request a stored configuration from the ML model database 112 or an external configuration from a second endpoint device (different from the endpoint device 110). If the model configuration circuitry 122 determines to request the stored configuration, then the process proceeds to block 406. Alternatively, if the model configuration circuitry 122 determines to request the external configuration, then the process proceeds to block 408.

At block 406, the example query circuitry 128 transmits a query to the ML model database 112. In this example, the query circuitry 128 transmits the query to request the stored configuration from the ML model database 112 (e.g., via the network 108). In some examples, the stored configuration is a random configuration stored in the ML model database 112. For example, the random configuration may have a random number of features in the feature set, a random number of parameters in the parameter set, a random combination of features, a random combination of parameters, etc.

At block 410, the example model configuration circuitry 122 can access the stored configuration from the ML model database 112.

Returning to block 408, the example query circuitry 128 transmits a query to a second endpoint device. In this example, the query circuitry 128 transmits a query to the second endpoint device to request the external configuration associated with an ML model running on the second endpoint device (e.g., via the network 108). For example, if the second endpoint device executes a random forest algorithm to classify malware, then the external configuration includes the feature set and/or the parameter set associated with the random forest algorithm. In this example, the query circuitry 128 transmits a query to the second endpoint device to retrieve the external configuration. In some examples, the query circuitry 128 accesses or retrieves the external configuration from the second endpoint device (e.g., automatically) or the second endpoint device transmits the external configuration to the query circuitry 128 (e.g., without being prompted or queried). In some examples, the second endpoint device is communicatively coupled to the server 102. In some examples, the computing environment 100 includes the second endpoint device. In some examples, the endpoint device 110 is coupled (e.g., via a wired connection or a wireless connection) to the second endpoint device.

At block 412, the model configuration circuitry 122 accesses the external configuration associated with the ML model running on the second endpoint device.

At block 414, the example model configuration circuitry 122 determines features and/or parameters for the configuration of the selected ML model 106. In some examples, the model configuration circuitry 122 can modify and/or otherwise generate the configuration of the selected ML model 106 based at least one of the default configuration (block 402), the stored configuration (block 410), or the external configuration (block 412), described in detail in connection with FIG. 5. Then, the process returns to FIG. 2.

Figure 5:
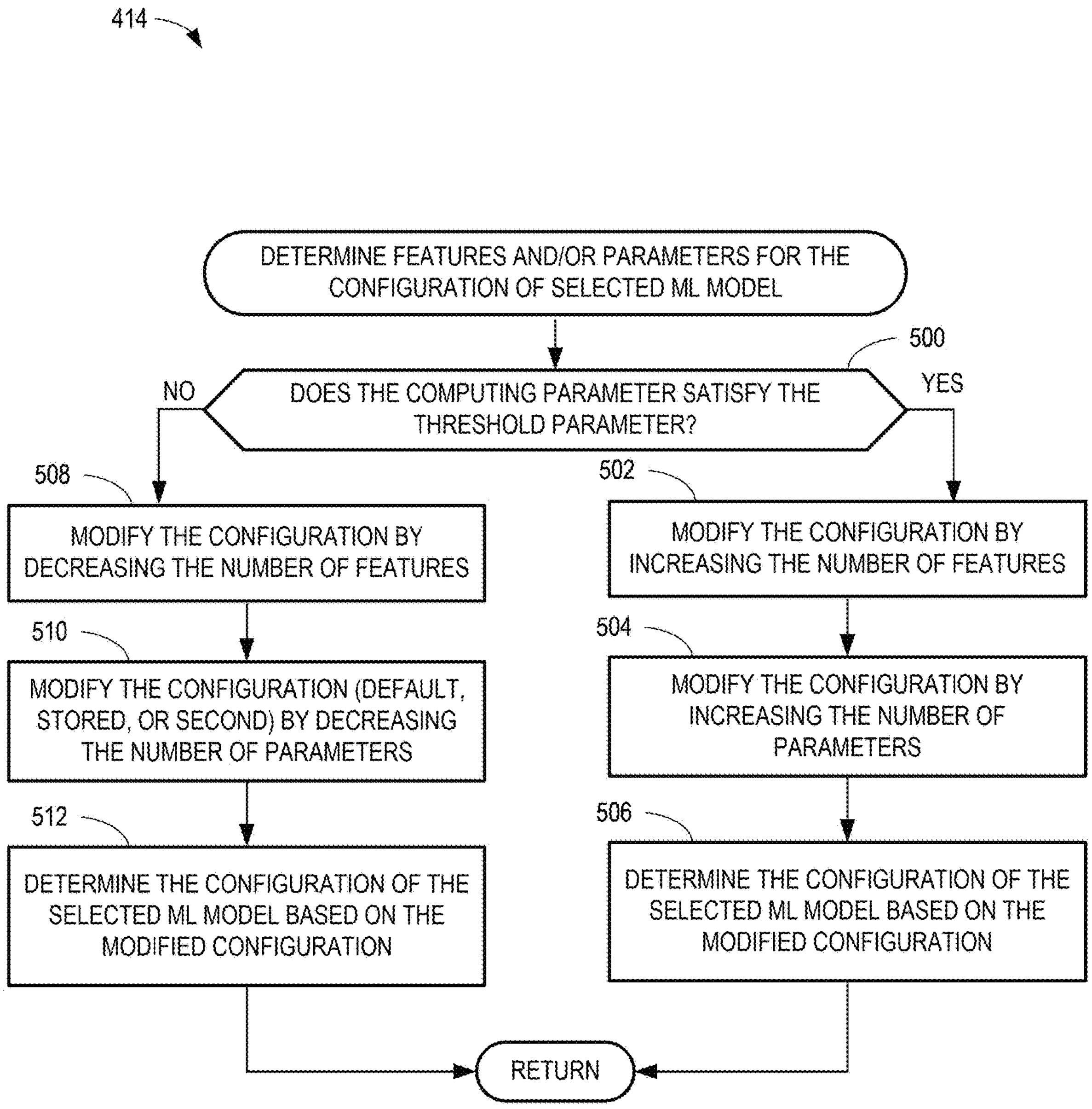

FIG. 5 is a flowchart representative of example machine readable instructions and/or example operations that may be executed, instantiated, and/or performed by programmable circuitry to determine features and/or parameters for the configuration of the selected ML model 106 in connection with block 414 of FIG. 4. The example machine-readable instructions and/or the example operations of FIG. 5 begin at block 500, at which the model configuration circuitry 122 determines whether the computing parameter of the endpoint device 110 satisfies the threshold parameter. In some examples, the default configuration can define the threshold parameter. For example, the default configuration associated with the selected ML model 106 may only be compatible with endpoint devices that include at least 10 GB of available memory. Accordingly, the default configuration can define the threshold parameter as 10 GB RAM. Similarly, if the stored configuration and/or the external configuration are only compatible with devices having at least 10 GB of available memory, then the threshold parameter can be 10 GB RAM.

If the model configuration circuitry 122 determines that the computing parameter associated with the endpoint device 110 satisfies the threshold parameter, then the process proceeds to block 502. For example, if the computer parameter is 32 GB RAM and the threshold parameter is 10 GB RAM, then the model configuration circuitry 122 can determine that the computer parameter satisfies the threshold parameter (e.g., 32 GB RAM>10 GB RAM). Put differently, the example model configuration circuitry 122 determines that the endpoint device 110 has more than enough available memory to support/operate the default configuration. In such examples, the process proceeds to block 502.

At block 502, the example model configuration circuitry 122 can modify the configuration by increasing the number of features. For example, after the model configuration circuitry 122 has determined that the endpoint device 110 has more than enough available memory to operate the configuration, the model configuration circuitry 122 can increase the complexity of the configuration by adding additional features. In some examples, the model configuration circuitry 122 can access additional features from the ML model database 112.

At block 504, the example model configuration circuitry 122 can modify the configuration by increasing the number of parameters. For example, after the model configuration circuitry 122 has determined that the endpoint device 110 has more than enough available memory to operate the configuration, the model configuration circuitry 122 can increase the complexity of the configuration by adding additional parameters. In some examples, the model configuration circuitry 122 can access additional parameters from the ML model database 112.

At block 506, the example model configuration circuitry 122 can determine the configuration (e.g., the final configuration) of the selected ML model 106 based on the modified configuration. For example, the model configuration circuitry 122 can add the additional features (block 502) and/or the additional parameters (block 504) to at least one of the default configuration, the stored configuration, or the external configuration. In other examples, the model configuration circuitry 122 can generate a new configuration based on the additional features (block 502) and/or the additional parameters (block 504). Then, the process returns to FIG. 2.

Returning to block 500, if the model configuration circuitry 122 determines that the computing parameter associated with the endpoint device 110 does not satisfy the threshold parameter, then the process proceeds to block 508. For example, if the computer parameter is 8 GB RAM and the threshold parameter is 10 GB RAM, then the model configuration circuitry 122 can determine that the computer parameter does not satisfy the threshold parameter (e.g., 8 GB RAM<10 GB RAM). Put differently, the example model configuration circuitry 122 determines that the endpoint device 110 does not have enough available memory to support/operate the configuration. In such examples, the process proceeds to block 508.

At block 508, the example model configuration circuitry 122 can modify the configuration by decreasing the number of features. For example, after the model configuration circuitry 122 has determined that the endpoint device 110 does not have enough available memory to operate the configuration, the model configuration circuitry 122 can decrease the complexity of the configuration by removing features. For example, the model configuration circuitry 122 can remove at least one feature from the default configuration, the stored configuration, the external configuration, etc. In other examples, if the default configuration includes a first number of features (e.g., 25 features), then the model configuration circuitry 122 can access a second number of features (e.g., 2 features) from the ML model database 112, the second number of features less than the first number of features (e.g., 2<25).

At block 510, the example model configuration circuitry 122 can modify the configuration by decreasing the number of parameters. For example, after the model configuration circuitry 122 has determined that the endpoint device 110 does not have enough available memory to operate the configuration, the model configuration circuitry 122 can decrease the complexity of the configuration by removing parameters. For example, the model configuration circuitry 122 can remove at least one parameter from the default configuration, the stored configuration, the external configuration, etc. In other examples, if the default configuration includes a first number of parameters (e.g., 5 parameters), then the model configuration circuitry 122 can access a second number of parameters (e.g., 2 parameters) from the ML model database 112, the second number of parameters less than the first number of parameters (e.g., 2<5).

At block 512, the example model configuration circuitry 122 can determine the configuration (e.g., the final configuration) of the selected ML model 106 based on the modified configuration. For example, the model configuration circuitry 122 can remove the features (block 508) and/or the parameters (block 510) from at least one of the default configuration, the stored configuration, or the external configuration. In other examples, the model configuration circuitry 122 can generate a new configuration based on the second number of features (block 508) and/or the second number parameters (block 510). Then, the process returns to FIG. 2.

Figure 6A:
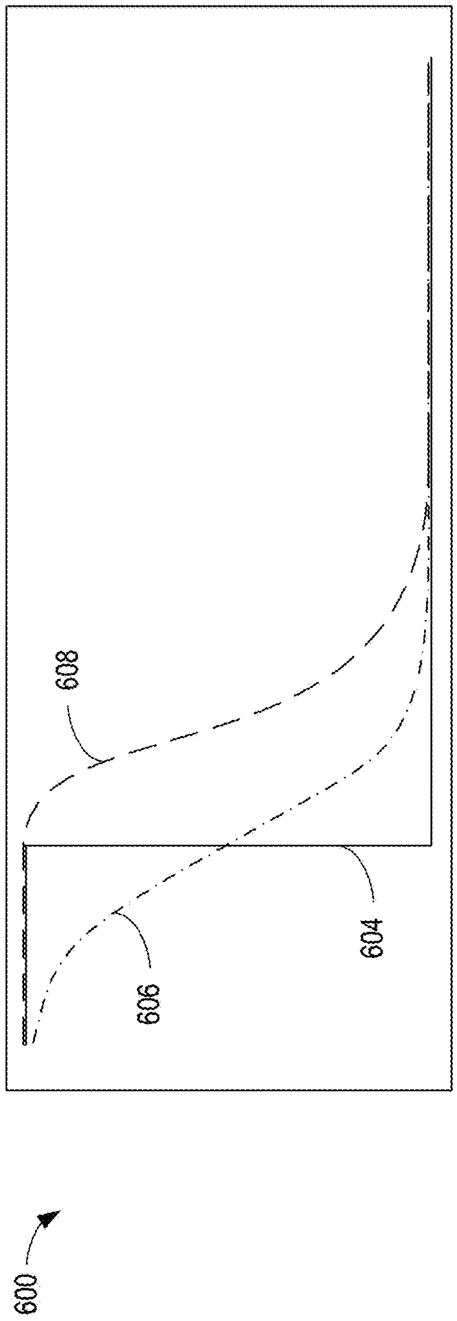
FIGS. 6A-6B include graphs to describe performance of the computing environment of FIG. 1 compared to previous implementations.
Figure 6B:
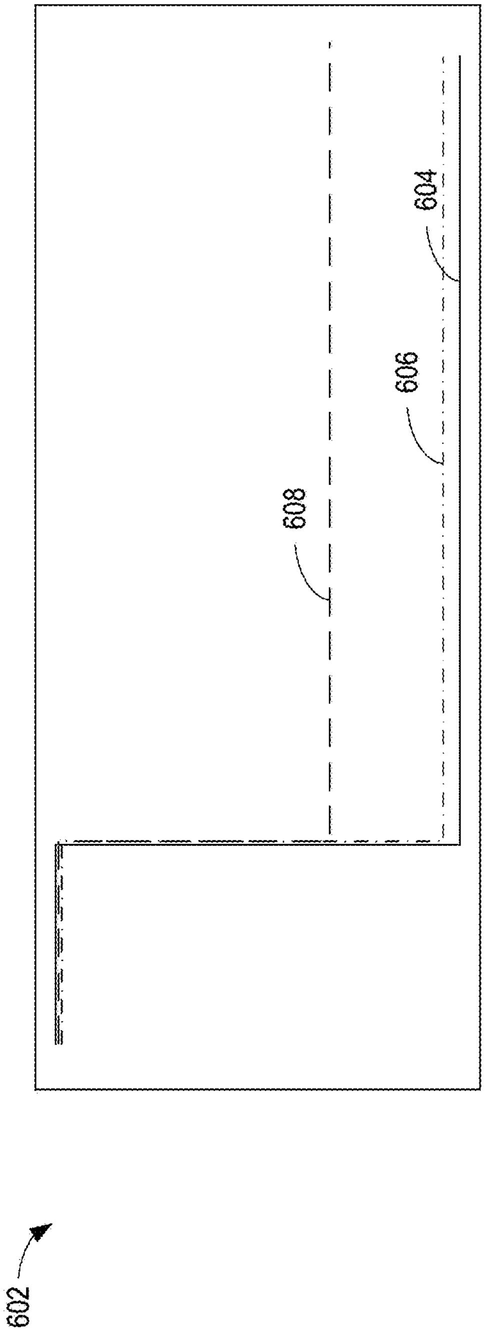

FIGS. 6A-6B include graphs 600, 602 to describe performance of the example computing environment 100 (FIG. 1) compared to previous implementations. In FIG. 6A, example plot 604 illustrates an example computing environment including endpoint devices that run (e.g., execute, employ, etc.) a uniform (e.g., fixed) ML model to classify malware. Example plot 606 illustrates an example computing environment (e.g., the computing environment 100) including one endpoint device (e.g., the endpoint device 110) that runs a ML model (e.g., the selected ML model 106) different from the fixed ML models running on the other endpoint devices. Example plot 608 illustrates an example computing environment (e.g., the computing environment 100) including 10 endpoint devices each running an ML model having a unique configuration determined in accordance with examples disclosed herein. The examples plots 604, 606, 608 illustrate the probability that an unclassified sample is correctly classified. For example, the plot 608 illustrates that the computing environment including 10 endpoint devices is the most likely to correctly classify a sample. Further, the plot 606 illustrates that the computing environment including at least one endpoint device running an ML model with a unique configuration may be less likely to correctly classify a sample compared to the plot 608, but is more effective than the plot 604 (the computing environment having a uniform ML model). FIG. 6B illustrates the plots 604, 606, 608 on a scale from 1 to (−1) epsilon.

FIG. 7 is a block diagram of an example programmable circuitry platform 700 structured to execute and/or instantiate the example machine-readable instructions and/or the example operations of FIGS. 2-5 to implement the tuning circuitry 104 of FIG. 1. The programmable circuitry platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 700 of the illustrated example includes programmable circuitry 712. The programmable circuitry 712 of the illustrated example is hardware. For example, the programmable circuitry 712 can be implemented by one or more integrated circuits, logic circuits, FPGAs, microprocessors, CPUs, GPUs, DSPs, and/or microcontrollers from any desired family or manufacturer. The programmable circuitry 712 may be implemented by one or more semiconductor based (e.g., silicon based) devices. In this example, the programmable circuitry 712 implements example device interface circuitry 118, example model selection circuitry 120, example model configuration circuitry 122, example query circuitry 128, example model deployment circuitry 124, and/or example sample classifier circuitry 126.

The programmable circuitry 712 of the illustrated example includes a local memory 713 (e.g., a cache, registers, etc.). The programmable circuitry 712 of the illustrated example is in communication with main memory 714, 716, which includes a volatile memory 714 and a non-volatile memory 716, by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717. In some examples, the memory controller 717 may be implemented by one or more integrated circuits, logic circuits, microcontrollers from any desired family or manufacturer, or any other type of circuitry to manage the flow of data going to and from the main memory 714, 716.

The programmable circuitry platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user (e.g., a human user, a machine user, etc.) to enter data and/or commands into the programmable circuitry 712. The input device(s) 722 can be implemented by, for example, an audio sensor, a microphone, a camera (still or video), a keyboard, a button, a mouse, a touchscreen, a trackpad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 700 of the illustrated example also includes one or more mass storage discs or devices 728 to store firmware, software, and/or data. Examples of such mass storage discs or devices 728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 732, which may be implemented by the machine readable instructions of FIGS. 2-5, may be stored in the mass storage device 728, in the volatile memory 714, in the non-volatile memory 716, and/or on at least one non-transitory computer readable storage medium such as a CD or DVD which may be removable.

Figure 8:
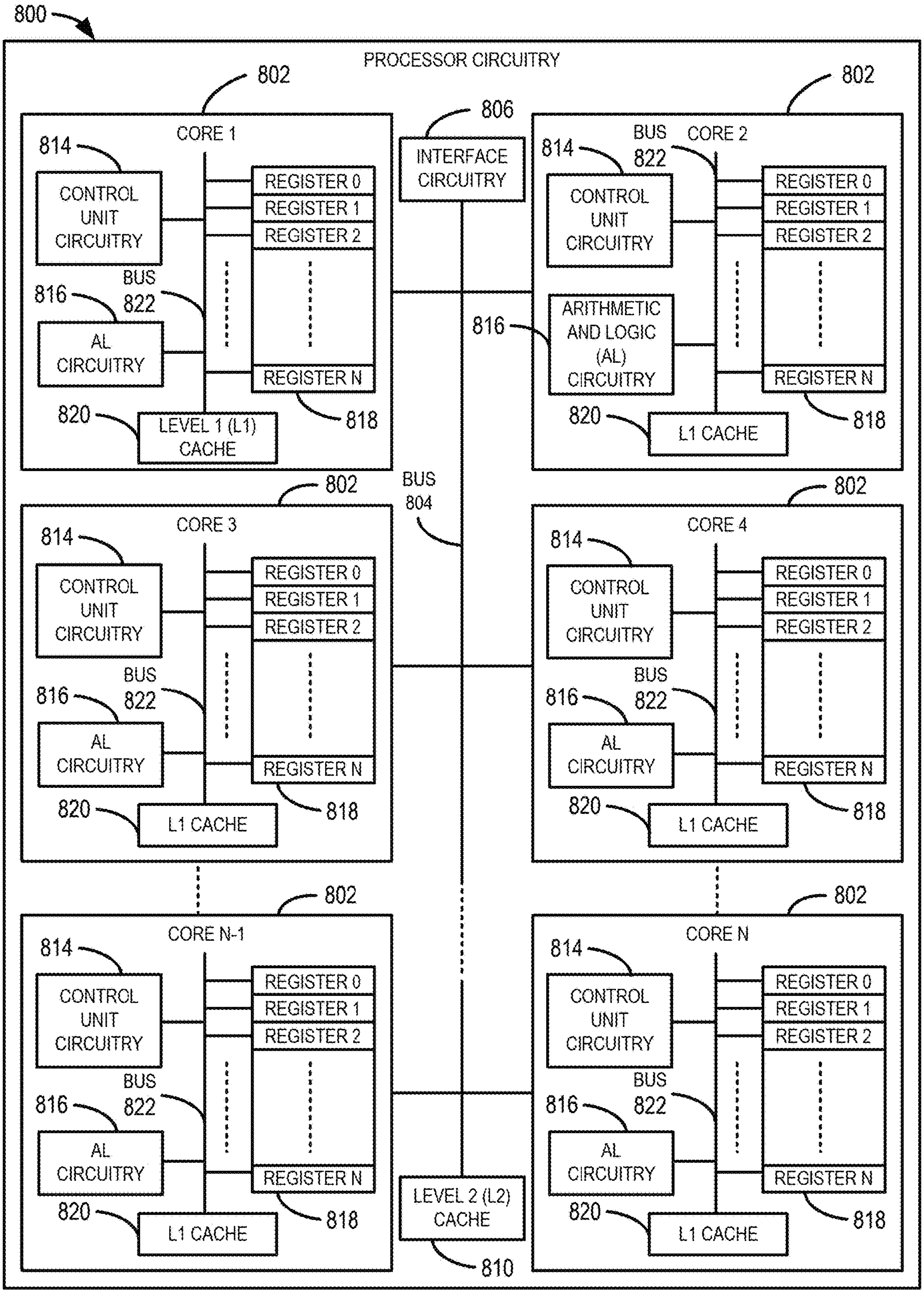
FIG. 8 is a block diagram of an example implementation of the programmable circuitry of FIG. 7.

FIG. 8 is a block diagram of an example implementation of the programmable circuitry 712 of FIG. 7. In this example, the programmable circuitry 712 of FIG. 7 is implemented by a microprocessor 800. For example, the microprocessor 800 may be a general-purpose microprocessor (e.g., general-purpose microprocessor circuitry). The microprocessor 800 executes some or all of the machine-readable instructions of the flowcharts of FIGS. 2-5 to effectively instantiate the circuitry of FIG. 1 as logic circuits to perform operations corresponding to those machine readable instructions. In some such examples, the circuitry of FIG. 1 is instantiated by the hardware circuits of the microprocessor 800 in combination with the machine-readable instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 2-5.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating-point operations. In yet other examples, the AL circuitry 816 may include first AL circuitry that performs integer-based operations and second AL circuitry that performs floating-point operations. In some examples, the AL circuitry 816 may be referred to as an Arithmetic Logic Unit (ALU).

The registers 818 are semiconductor-based structures to store data and/or instructions such as results of one or more of the operations performed by the AL circuitry 816 of the corresponding core 802. For example, the registers 818 may include vector register(s), SIMD register(s), general-purpose register(s), flag register(s), segment register(s), machine-specific register(s), instruction pointer register(s), control register(s), debug register(s), memory management register (s), machine check register(s), etc. The registers 818 may be arranged in a bank as shown in FIG. 8. Alternatively, the registers 818 may be organized in any other arrangement, format, or structure, such as by being distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages.

The microprocessor 800 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 800, in the same chip package as the microprocessor 800 and/or in one or more separate packages from the microprocessor 800.

Figure 9:
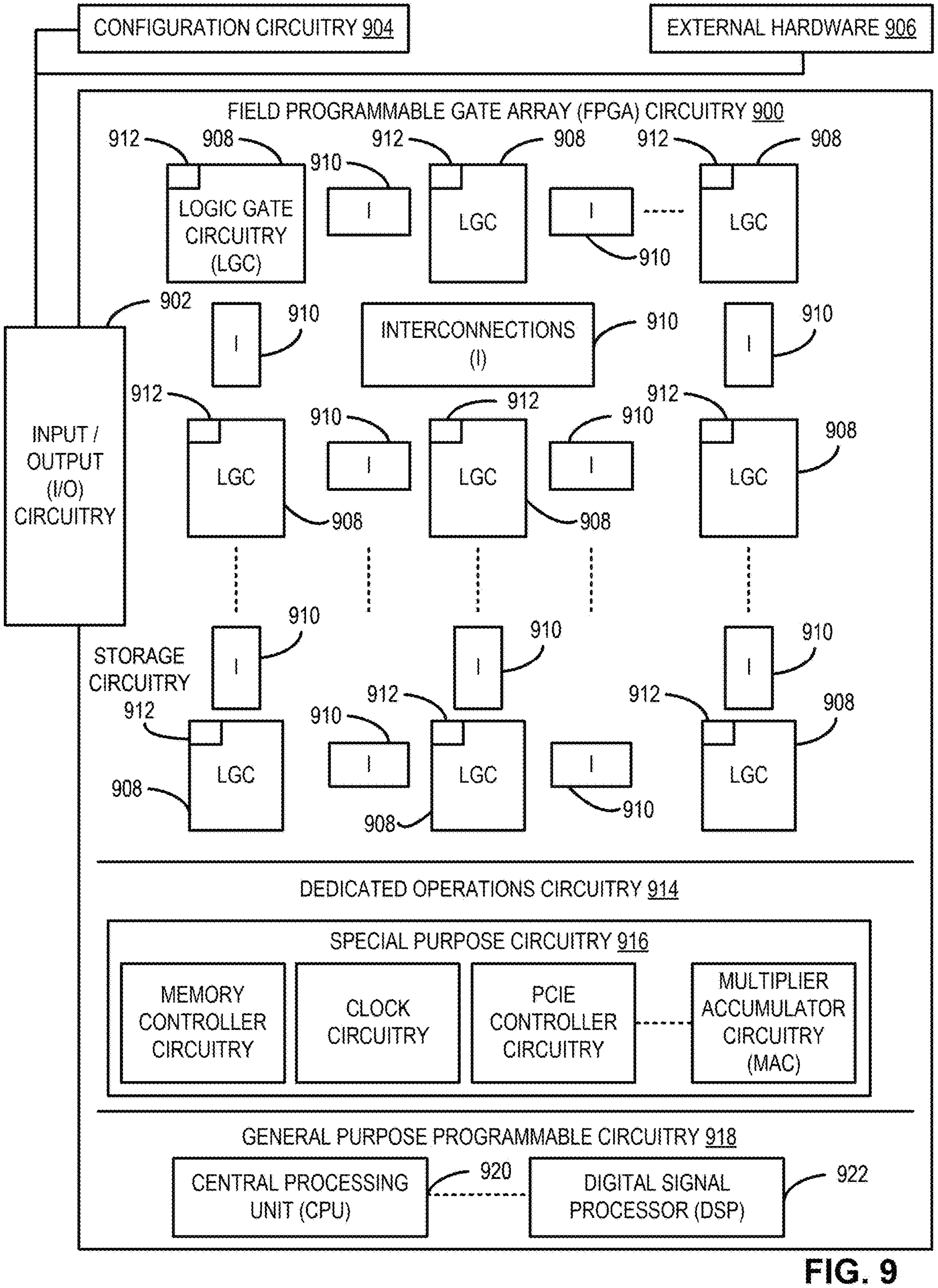
FIG. 9 is a block diagram of another example implementation of the programmable circuitry of FIG. 7.

FIG. 9 is a block diagram of another example implementation of the programmable circuitry 712 of FIG. 7. In this example, the programmable circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 800 of FIG. 8 described above (which is a general purpose device that may be programmed to execute some or all of the machine readable instructions represented by the flowchart (s) of FIGS. 2-5 but whose interconnections and logic circuitry are fixed once fabricated), the FPGA circuitry 900 of the example of FIG. 9 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 2-5. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 2-5. As such, the FPGA circuitry 900 may be configured and/or structured to effectively instantiate some or all of the operations/functions corresponding to the machine readable instructions of the flowchart(s) of FIGS. 2-5 as dedicated logic circuits to perform the operations/functions corresponding to those software instructions in a dedicated manner analogous to an ASIC. Therefore, the FPGA circuitry 900 may perform the operations/functions corresponding to the some or all of the machine readable instructions of FIGS. 2-5 faster than the general-purpose microprocessor can execute the same.

In the example of FIG. 9, the FPGA circuitry 900 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 900 of FIG. 9 may access and/or load the binary file to cause the FPGA circuitry 900 of FIG. 9 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 900 of FIG. 9 to cause configuration and/or structuring of the FPGA circuitry 900 of FIG. 9, or portion(s) thereof.

The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain a binary file, which may be implemented by a bit stream, data, and/or machine-readable instructions, to configure the FPGA circuitry 900, or portion(s) thereof. In some such examples, the configuration circuitry 904 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 906 may be implemented by external hardware circuitry. For example, the external hardware 906 may be implemented by the microprocessor 800 of FIG. 8.

The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations/functions that may correspond to at least some of the machine readable instructions of FIGS. 2-5 and/or other desired operations. The logic gate circuitry 908 shown in FIG. 9 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations/functions. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example dedicated operations circuitry 914. In this example, the dedicated operations circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the programmable circuitry 712 of FIG. 7, many other approaches are contemplated. For example, FPGA circuitry may include an on-board CPU, such as one or more of the example CPU 920 of FIG. 8. Therefore, the programmable circuitry 712 of FIG. 7 may additionally be implemented by combining at least the example microprocessor 800 of FIG. 8 and the example FPGA circuitry 900 of FIG. 9. In some such hybrid examples, one or more cores 802 of FIG. 8 may execute a first portion of the machine readable instructions represented by the flowchart(s) of FIGS. 2-5 to perform first operation(s)/function(s), the FPGA circuitry 900 of FIG. 9 may be configured and/or structured to perform second operation(s)/function(s) corresponding to a second portion of the machine readable instructions represented by the flowcharts of FIGS. 2-5, and/or an ASIC may be configured and/or structured to perform third operation(s)/function(s) corresponding to a third portion of the machine readable instructions represented by the flowcharts of FIGS. 2-5.

It should be understood that some or all of the circuitry of FIG. 1 may, thus, be instantiated at the same or different times. For example, same and/or different portion(s) of the microprocessor 800 of FIG. 8 may be programmed to execute portion(s) of machine-readable instructions at the same and/or different times. In some examples, same and/or different portion(s) of the FPGA circuitry 900 of FIG. 9 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 800 of FIG. 8 may execute machine readable instructions in one or more threads executing concurrently and/or in series. In some examples, the FPGA circuitry 900 of FIG. 9 may be configured and/or structured to carry out operations/functions concurrently and/or in series. Moreover, in some examples, some or all of the circuitry of FIG. 1 may be implemented within one or more virtual machines and/or containers executing on the microprocessor 800 of FIG. 8.

In some examples, the programmable circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the programmable circuitry 712 of FIG. 7, which may be in one or more packages. For example, the XPU may include a CPU (e.g., the microprocessor 800 of FIG. 8, the CPU 920 of FIG. 9, etc.) in one package, a DSP (e.g., the DSP 922 of FIG. 9) in another package, a GPU in yet another package, and an FPGA (e.g., the FPGA circuitry 900 of FIG. 9) in still yet another package.

Figure 10:
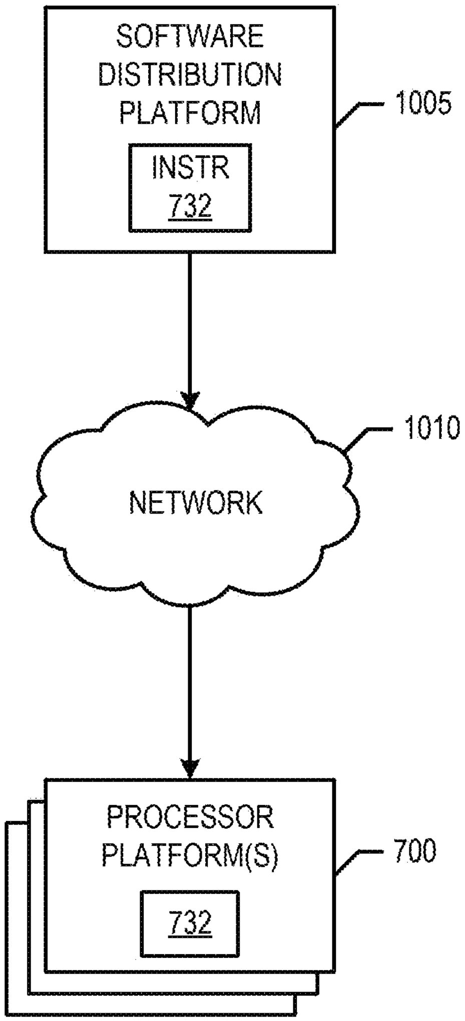
FIG. 10 is a block diagram of an example software/firmware/instructions distribution platform (e.g., one or more servers) to distribute software, instructions, and/or firmware (e.g., corresponding to the example machine readable instructions of FIGS. 2-5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to other hardware devices (e.g., hardware devices owned and/or operated by third parties from the owner and/or operator of the software distribution platform) is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions of FIGS. 2-5, as described above. The one or more servers of the example software distribution platform 1005 are in communication with an example network 1010, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions of FIG. 2-5, may be downloaded to the example programmable circuitry platform 700, which is to execute the machine readable instructions 732 to implement the tuning circuitry 104. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that determine unique ML model configurations to capitalize on the diverse computing capabilities of computing devices operating to detect malware in an example computing environment. Further, disclosed examples determine (e.g., tailor) model configurations based on a computing parameter associated with the endpoint device. Examples disclosed herein ensure that the complexity and performance of the model configuration is proportional to (e.g., matches) the complexity and performance of the endpoint device. So instead of a uniform ML model deployed to a plurality of devices in a computing environment, examples disclosed herein can tailor ML model configurations to unique computing parameters associated with each computing device in a computing environment. Moreover, examples disclosed herein generate diverse ML model configurations that offer a wide variety of detection mechanisms to scan (e.g., analyze) unclassified samples. Disclosed systems, apparatus, articles of manufacture, and methods improve the efficiency of using a computing device by mitigating malware with a variety or diverse ML models deployed on endpoint devices. Disclosed systems, apparatus, articles of manufacture, and methods are accordingly directed to one or more improvement(s) in the operation of a machine such as a computer or other electronic and/or mechanical device.

Example 1 includes a server comprising interface circuitry, machine readable instructions, and programmable circuitry to at least one of instantiate or execute the machine readable instructions to determine a computing parameter associated with a computing device, the computing device communicatively coupled to the server, select a machine learning (ML) model to deploy on the computing device based on the computing parameter, determine a configuration of the ML model based on the computing parameter, deploy the ML model to the computing device, and cause the deployed ML model to classify a sample as clean or malicious, the sample received at the computing device.

Example 2 includes the server of example 1, wherein the computing device is a first computing device and the ML model is a first ML model, wherein the programmable circuitry is to determine the configuration of the first ML model by transmitting a query to a second computing device coupled to the server, the second computing device deploying a second ML model to classify samples, the query requesting a configuration associated with the second ML model, and determining the configuration of the first ML model based on the configuration associated with the second ML model.

Example 3 includes the server of example 2, wherein the programmable circuitry is to modify the configuration of the first ML model by removing at least one of features or parameters from the configuration of the first ML model.

Example 4 includes the server of example 2, wherein the programmable circuitry is to modify the configuration of the first ML model by adding at least one of features or parameters to the configuration of the first ML model.

Example 5 includes the server of example 1, wherein the computing parameter of the computing device includes at least one of an amount of available memory associated with the computing device or central processing unit (CPU) capability associated with the computing device.

Example 6 includes the server of example 1, wherein the ML model is a first ML model, wherein the programmable circuitry is to select a second ML model to deploy on the computing device based on the computing parameter, the second ML model to classify the sample in parallel with the first ML model.

Example 7 includes the server of example 6, wherein the sample is a first portion of the sample, wherein the programmable circuitry is to deploy the second ML model on the computing device, and cause the deployed ML model to classify a second portion of the sample as clean or malicious, the second portion of the sample different from the first portion of the sample.

Example 8 includes a non-transitory machine readable storage medium comprising instructions to cause programmable circuitry to at least determine a computing parameter associated with a computing device, the computing device communicatively coupled to a server, select a machine learning (ML) model to deploy on the computing device based on the computing parameter, determine a configuration of the ML model based on the computing parameter, deploy the ML model to the computing device, and cause the deployed ML model to classify a sample as clean or malicious, the sample received at the computing device.

Example 9 includes the non-transitory machine readable storage medium of example 8, wherein the computing device is a first computing device and the ML model is a first ML model, wherein the instructions cause the programmable circuitry to determine the configuration of the first ML model by transmitting a query to a second computing device communicatively coupled to the server, the second computing device deploying a second ML model to classify samples, the query requesting a configuration associated with the second ML model, and determining the configuration of the first ML model based on the configuration associated with the second ML model.

Example 10 includes the non-transitory machine readable storage medium of example 9, wherein the instructions cause the programmable circuitry to modify the configuration of the first ML model by removing at least one of features or parameters from the configuration of the first ML model.

Example 11 includes the non-transitory machine readable storage medium of example 9, wherein the instructions cause the programmable circuitry to modify the configuration of the first ML model by adding at least one of features or parameters to the configuration of the first ML model.

Example 12 includes the non-transitory machine readable storage medium of example 8, wherein the computing parameter of the computing device includes at least one of an amount of available memory associated with the computing device or central processing unit (CPU) capability associated with the computing device.

Example 13 includes the non-transitory machine readable storage medium of example 8, wherein the ML model is a first ML model, wherein the instructions cause the programmable circuitry to select a second ML model to deploy on the computing device based on the computing parameter, the second ML model to classify the sample in parallel with the first ML model.

Example 14 includes the non-transitory machine readable storage medium of example 13, wherein the sample is a first portion of the sample, wherein the instructions cause the programmable circuitry to deploy the second ML model on the computing device, and cause the deployed ML model to classify a second portion of the sample as clean or malicious, the second portion of the sample different from the first portion of the sample.

Example 15 includes a method comprising determining a computing parameter associated with a computing device, the computing device communicatively coupled to the server, selecting a machine learning (ML) model to deploy on the computing device based on the computing parameter, determining a configuration of the ML model based on the computing parameter, deploying the ML model to the computing device, and cause the deployed ML model to classify a sample as clean or malicious, the sample received at the computing device.

Example 16 includes the method of example 15, wherein the computing device is a first computing device and the ML model is a first ML model, wherein determining the configuration of the first ML model further includes transmitting a query to a second computing device communicatively coupled to the server, the second computing device deploying a second ML model to classify samples, the query requesting a configuration associated with the second ML model, and determining the configuration of the first ML model based on the configuration associated with the second ML model.

Example 17 includes the method of example 16, further including modifying the configuration of the first ML model by removing at least one of features or parameters from the configuration of the first ML model.

Example 18 includes the method of example 16, further including modifying the configuration of the first ML model by adding at least one of features or parameters to the configuration of the first ML model.

Example 19 includes the method of example 15, wherein the computing parameter of the computing device includes at least one of an amount of available memory associated with the computing device or central processing unit (CPU) capability associated with the computing device.

Example 20 includes the method of example 15, wherein the ML model is a first ML model, further including selecting a second ML model to deploy on the computing device based on the computing parameter, the second ML model to classify the sample in parallel with the first ML model.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A server comprising:

interface circuitry;

machine readable instructions; and programmable circuitry to at least one of instantiate or execute the machine readable instructions to:

determine a computing parameter associated with a computing device, the computing device communicatively coupled to the server;

select a machine learning (ML) model to deploy on the computing device based on the computing parameter;

determine a configuration of the ML model based on the computing parameter;

deploy the ML model to the computing device; and cause the deployed ML model to classify a sample as clean or malicious, the sample received at the computing device; and wherein the computing device is a first computing device and the ML model is a first ML model, wherein the programmable circuitry is to determine the configuration of the first ML model by:

transmitting a query to a second computing device coupled to the server, the second computing device deploying a second ML model to classify samples, the query requesting a configuration associated with the second ML model; and determining the configuration of the first ML model based on the configuration associated with the second ML model.

2. The server of claim 1, wherein the programmable circuitry is to modify the configuration of the first ML model by removing at least one of features or parameters from the configuration of the first ML model.

3. The server of claim 1, wherein the programmable circuitry is to modify the configuration of the first ML model by adding at least one of features or parameters to the configuration of the first ML model.

4. The server of claim 1, wherein the computing parameter of the computing device includes at least one of an amount of available memory associated with the computing device or central processing unit (CPU) capability associated with the computing device.

5. The server of claim 1, wherein the ML model is a first ML model, wherein the programmable circuitry is to select a second ML model to deploy on the computing device based on the computing parameter, the second ML model to classify the sample in parallel with the first ML model.

6. The server of claim 5, wherein the sample is a first portion of the sample, wherein the programmable circuitry is to:

deploy the second ML model on the computing device; and cause the deployed ML model to classify a second portion of the sample as clean or malicious, the second portion of the sample different from the first portion of the sample.

7. A non-transitory machine readable storage medium comprising instructions to cause programmable circuitry to at least:

determine a computing parameter associated with a computing device, the computing device communicatively coupled to a server;

select a machine learning (ML) model to deploy on the computing device based on the computing parameter;

determine a configuration of the ML model based on the computing parameter;

deploy the ML model to the computing device; and cause the deployed ML model to classify a sample as clean or malicious, the sample received at the computing device;

wherein the computing device is a first computing device and the ML model is a first ML model, wherein the instructions cause the programmable circuitry to determine the configuration of the first ML model by:

transmitting a query to a second computing device communicatively coupled to the server, the second computing device deploying a second ML model to classify samples, the query requesting a configuration associated with the second ML model; and determining the configuration of the first ML model based on the configuration associated with the second ML model.

8. The non-transitory machine readable storage medium of claim 7, wherein the instructions cause the programmable circuitry to modify the configuration of the first ML model by removing at least one of features or parameters from the configuration of the first ML model.

9. The non-transitory machine readable storage medium of claim 7, wherein the instructions cause the programmable circuitry to modify the configuration of the first ML model by adding at least one of features or parameters to the configuration of the first ML model.

10. The non-transitory machine readable storage medium of claim 7, wherein the computing parameter of the computing device includes at least one of an amount of available memory associated with the computing device or central processing unit (CPU) capability associated with the computing device.

11. The non-transitory machine readable storage medium of claim 7, wherein the ML model is a first ML model, wherein the instructions cause the programmable circuitry to select a second ML model to deploy on the computing device based on the computing parameter, the second ML model to classify the sample in parallel with the first ML model.

12. The non-transitory machine readable storage medium of claim 11, wherein the sample is a first portion of the sample, wherein the instructions cause the programmable circuitry to:

deploy the second ML model on the computing device; and cause the deployed ML model to classify a second portion of the sample as clean or malicious, the second portion of the sample different from the first portion of the sample.

13. A method comprising:

determining a computing parameter associated with a computing device, the computing device communicatively coupled to a server;

selecting a machine learning (ML) model to deploy on the computing device based on the computing parameter;

determining a configuration of the ML model based on the computing parameter;

deploying the ML model to the computing device; and cause the deployed ML model to classify a sample as clean or malicious, the sample received at the computing device;

wherein the computing device is a first computing device and the ML model is a first ML model, wherein determining the configuration of the first ML model further includes:

transmitting a query to a second computing device communicatively coupled to the server, the second computing device deploying a second ML model to classify samples, the query requesting a configuration associated with the second ML model; and determining the configuration of the first ML model based on the configuration associated with the second ML model.

14. The method of claim 13, further including modifying the configuration of the first ML model by removing at least one of features or parameters from the configuration of the first ML model.

15. The method of claim 13, further including modifying the configuration of the first ML model by adding at least one of features or parameters to the configuration of the first ML model.

16. The method of claim 13, wherein the computing parameter of the computing device includes at least one of an amount of available memory associated with the computing device or central processing unit (CPU) capability associated with the computing device.

17. The method of claim 13, wherein the ML model is a first ML model, further including selecting a second ML model to deploy on the computing device based on the computing parameter, the second ML model to classify the sample in parallel with the first ML model.

* * * * *